Patented Aug. 10, 1954

2,686,180

UNITED STATES PATENT OFFICE 2,686,180

ESTERIFICATION PROCESS

Erich Schmidt, Bad Reichenhall, and Robert Schnegg, Dormagen, Germany, assignors to Farbenfabriken Bayer Aktiengesellschaft, Leverkusen, Germany, a corporation of Germany No Drawing. Application January 3, 1951, Serial No. 204,280

Claims priority, application Germany January 5, 1950

6 Claims. (Cl. 260—230)

The present invention relates to a process of producing carboxylic acid esters. The production of carboxylic acid esters is accomplished in practice according to a plurality of processes. Thus, for instance, these esters are customarily prepared from carboxylic acids, their anhydrides or chlorides by reaction with alcohols in the presence of strong mineral acids or alkalies. The reaction of the acid chlorides and alcohols in the presence of tertiary bases, such as pyridine, is also commonly used. This reaction, however, generally requires the application of higher temperatures and large excesses of pyridine. Another possibility of producing carboxylic acid esters consists in reacting carboxylic acid salts with alkyl halides at elevated temperatures.

The above prior art processes of producing carboxylic acid esters possess the disadvantage that a large excess of one of the reactants is necessary in order to obtain as complete an esterification as possible.

The esterification of many organic compounds meets with considerable difficulty since a great number of organic compounds are not stable or stable only to a limited degree in the presence of mineral acids and alkalies so that the desired esters are obtained in poor yields and are contaminated by secondary reaction products.

It is therefore an object of the present invention to provide an esterification process which avoids the above difficulties and drawbacks.

A further object resides in the use of an esterification catalyst which renders possible the formation of esters from carboxylic acids and alcohols at essentially lower temperatures and under milder conditions than possible before.

Further objects will become apparent as the following specification proceeds.

These objects are accomplished by reacting equivalent amounts of a carboxylic acid and an alcohol in the presence of a carbodiimide. The esters produced according to the present invention are obtained in excellent yields. The carbodiimide is converted into the analogous urea. The reaction proceeds (with reference to the starting and end products) according to the following formula:

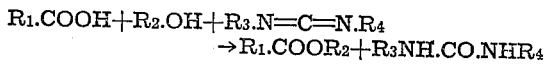

In the above formula $R_1$, $R_3$ and $R_4$ represent one of the following: hydrogen; straight or branched chain saturated or unsaturated aliphatic radicals; substituted straight or branched chain saturated or unsaturated aliphatic radicals; hydroaromatic or hetrocyclic ring systems; substituted hydroaromatic or hetrocyclic ring systems; aromatic radicals or substituted aromatic radicals; and $R_2$ designates any of the above indicated radicals except hydrogen.

The unexpected ease, with which the esterification according to the present invention proceeds, is demonstrated by the fact, that the reaction is performed readily at room temperature, so that heating is unnecessary in most cases. Only in a few cases is the employment of water-bath-temperature necessary to increasing the speed of reaction, whereas the prior art methods often require elevated temperatures, as are obtained, for instance, by heating in a sealed tube. Since the reaction proceeds without the employment of mineral acids or alkalies, sensitive organic compounds, both in the alcohol and acid components, may now be esterified.

A slight excess of one component in the above equation generally suffices to achieve high or nearly quantitative yields.

In most of the hitherto known processes the acids have to be used in form of their chlorides or anhydrides in order to render them accessible to the esterification step with alcohols. This necessity often encounters great, sometimes insurmountable difficulties, especially when operating with less stable compounds.

All these disadvantages are eliminated when utilizing the process of the present invention which permits of reacting the acids as such in media free of mineral acids and alkalies.

The reaction need not, be carried out in the presence of a solvent which dissolves one or more of the reactants. In many cases, even aqueous solutions of the acids and alcohols can be employed provided that the carbodiimide, which is preferably used in liquid form, is finely distributed by shaking or stirring.

In special cases it is advantageous to operate in a two-phase-system. The reaction is preferably, but not necessarily, carried out in the presence of small amounts of pyridine. The amount of pyridine to be used is usually much smaller than one mol, calculated on the acid charged.

It is generally advisable first to charge the alcohol and the carbodiimide, if necessary, dissolved in a suitable organic solvent, and to slowly add the solution of the acid or the volatile acid as such. In most cases, the reaction starts at once or upon slightly heating; and depending on the kind of the reactants used is completed within a period of a few minutes to several hours.

The recovery of the reaction product is accomplished without difficulty if the carbodiimide charged has been appropriately chosen. The esters are largely obtained in an analytically pure state. The carbodiimides are preferably prepared according to the process of our copending application of even date herewith, Ser. No. 204,185.

The invention is further illustrated by the following examples without being restricted thereto.

*Example 1*

A solution of 6.9 grams of salicylic acid in 20 cc. of methanol is dropped within a period of 30 minutes into a boiling methanol solution of 5.6 grams containing methyl-tertiary-butyl-carbodiimide in a flask provided with a reflux condensor on a water bath. The reaction is complete after 30 minutes.

The contents of the flask are then poured into 100 cc. of saturated common salt solution, extracted with 100 cc. of ether and extracted once more with 50 cc. of ether. The ether extracts are purified by washing, and are dried with $CaCl_2$, and then are liberated from ether and the residue is distilled in vacuo.

The salicylic acid-methyl-ester distills over at 95–97° C. under 10 mm. pressure in a yield of 72% of the theoretical.

*Example 2*

7.6 grams of phenoxy-acetic acid are reacted with methanol in the presence of 5.6 grams of carbodiimide as described in Example 1. The reaction product is recovered by extraction with methylene chloride.

7.81 grams of phenoxy-acetic-acid-methyl-ester boiling at 140° C. under 10 mm. pressure are obtained corresponding to a yield of 94%.

*Example 3*

4.2 parts of β-chloroethyl-alcohol, 4.7 parts of chloro-acetic acid and 2.0 parts of pyridine are dissolved in 70 parts of ether. To this solution are added 6.3 parts of diisopropyl-carbodiimide. 6.3 parts of diisopropyl urea corresponding to 87.5% of the theoretical presently crystallize and are filtered off. After washing and drying the ether is evaporated from the solution and the remaining residue is distilled in vacuo.

6.5 parts of pure β-chloro-ethyl-ester of chloro-acetic acid corresponding to a yield of 82.8% of the theoretical distill over at 90–92° C. under 10 mm. pressure.

*Example 4*

4.2 parts of β-chloro-ethyl-alcohol, 4.7 parts of chloro-acetic acid and 3.9 parts of pyridine are dissolved in ether as indicated in Example 3. 10.3 parts of dicyclohexylcarbodiimide in 30 parts of ether are dropped into the solution formed. 10.8 parts of dicyclo-hexyl-urea corresponding to yield of 96.34% of the theoretical precipitate after some minutes.

7.8 parts of pure β-chloro-ethyl-ester of chloroacetic acid which correspond to 98.8% of the theoretical are obtained from the ethereal solution.

*Example 5*

An almost colorless fatty acid mixture prepared from rape oil purified by high vacuum distillation, boiling at 145–181° C. under 0.03 mm. pressure, having an acid number of 202 and a medium molecular weight of 278, is employed as starting material.

20.71 parts of this fatty acid mixture are made up to 98 grams by adding methanol and cooled. 8.4 grams of methyl-tertiary-butyl-carbodiimide are dissolved in 8.4 grams of methanol and added to the fatty acid solution. The solution formed soon becomes turbid and, after some time, abundant amounts of a white substance precipitate which disappears again without residue after standing at room temperature for 7 days. The reaction product is isolated with the addition of methylene chloride. No appreciable residue is left in the distillation in high vacuo.

The yield of methyl ester of the fatty acids amounts to 21.8 grams corresponding to 100% of the theoretical. The ester boils at 80–200° C. under 0.4 mm. pressure.

The determination of the distillate shows an acid number of 8.4. Consequently 94.2% of the acid initially present have been converted into the methyl ester.

*Example 6*

25.6 parts of a commercial acetone-soluble acetylcellulose containing 2.24 acetyl radicals and 0.76 free OH-groups per glucose unit are completely dissolved in 200 parts of acetone. 9 parts of monochloroacetic acid and 2 parts of pyridine are added with stirring to the above solution. Thereupon a solution of 19.6 parts of dicyclo-hexyl-carbodiimide in 50 parts of acetone is run in.

The reaction starts almost at once with precipitation of dicyclo-hexyl-urea and is self-heating. The reaction temperature is kept at about 32–35° C. by appropriately adjusting the addition of carbodiimide. The reaction mixture is stirred for another 2 hours, the precipitate is separated by filtering and the acetone solution is precipitated by adding water. The precipitated cellulose-aceto-chloracetate is washed with water and methanol and dried. The product contains 4.05% chlorine corresponding to 10.8% combined chloroacetic acid.

Whereas the introduction of chloroacetic acid into cellulose or cellulose derivatives cannot be achieved by conventional methods without decomposing the cellulose to a substantial degree, no decomposition occurs when utilizing the process of the present invention.

We claim:

1. A process of producing carboxylic acid esters, which process comprises mixing an organic acid selected from the group consisting of saturated aliphatic acids, chlorine substituted saturated aliphatic acids and aromatic carboxylic acids with an aliphatic alcohol in the presence of a carbodiimide of the general formula $$R-N=C=N-R$$

wherein R is a radical selected from the group consisting of hydrogen, an aliphatic hydrocarbon radical and a cycloaliphatic hydrocarbon radical, and allowing the mixture to react for at least ten minutes.

2. A process of producing carboxylic acid esters, which process comprises mixing an organic selected from the group consisting of saturated aliphatic acids, chlorine substituted saturated aliphatic acids and aromatic carboxylic acids with an aliphatic alcohol in the presence of a carbodiimide of the general formula $$R-N=C=N-R$$

wherein R is a radical selected from the group consisting of hydrogen, an aliphatic hydrocarbon radical and a cycloaliphatic hydrocarbon radical, and allowing the mixture to react for at least ten minutes at a temperature between room temperature and about 100° C.

3. A process which comprises dissolving a lower dialkyl-carbodiimide in a lower aliphatic alcohol gradually adding to the boiling solution an amount of salicylic acid equivalent to the amount of carbodiimide and refluxing the mixture for at least 30 minutes.

4. A process which comprises dissolving about equimolecular proportions of chloroethanol and chloroacetic acid in ether, adding thereto a small amount of pyridine and an equimolecular amount of a carbodiimide, leaving the mixture to stand until no further crystallisation can be observed and recovering the ester formed by distillation.

5. A process which comprises mixing a long chain fatty acid with an excess over the equimolecular proportion of a lower aliphatic alcohol, adding to the mixture an equimolecular proportion of a lower aliphatic carbodiimide, leaving the mixture to stand for a prolonged period and recovering the lower aliphatic-alcohol-fatty-acid-ester formed.

6. A process which comprises dissolving acetylcellulose in acetone, adding to the solution an amount of chloroacetic acid about equivalent to the free hydroxyl group of said acetyl cellulose and a small amount of pyridine, further adding to the mixture an amount of dicyclohexylcarbodiimide equivalent to the amount of chloroacetic acid, leaving the mixture to react for several hours and recovering the modified cellulose acetate.

References Cited in the file of this patent

Richter's Organic Chemistry, D'Albe, vol. 2, Carbocyclic Series (1922), Blakiston's and Sons, Philadelphia, pages 106–7.